United States Patent
Li et al.

(10) Patent No.: US 7,538,988 B2
(45) Date of Patent: May 26, 2009

(54) METHOD AND APPARATUS HAVING IMPROVED MAGNETIC READ HEAD SENSORS

(75) Inventors: Jinshan Li, San Jose, CA (US);
Alexander M. Zeltser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 265 days.

(21) Appl. No.: 10/955,396

(22) Filed: Sep. 30, 2004

(65) Prior Publication Data

US 2006/0067012 A1 Mar. 30, 2006

(51) Int. Cl.
*G11B 5/127* (2006.01)
(52) U.S. Cl. .................................. 360/324.11
(58) Field of Classification Search ............ 360/324.11, 360/324.12; 29/603.14
See application file for complete search history.

(56) References Cited

U.S. PATENT DOCUMENTS

| | | | |
|---|---|---|---|
| 5,658,396 A | 8/1997 | Sakurada et al. | |
| 6,252,748 B1 | 6/2001 | Yamanaka et al. | |
| 6,396,734 B2 * | 5/2002 | Ishikawa et al. | 365/158 |
| 6,587,317 B2 * | 7/2003 | Gill | 360/324.11 |
| 6,674,616 B2 * | 1/2004 | Gill | 360/324.12 |
| 2003/0044303 A1 | 3/2003 | Chen et al. | |
| 2003/0058576 A1 | 3/2003 | Honjo et al. | |
| 2003/0072111 A1 | 4/2003 | Hasegawa et al. | |
| 2003/0193762 A1 | 10/2003 | Hayashi et al. | |
| 2003/0227724 A1 | 12/2003 | Li et al. | |

* cited by examiner

*Primary Examiner*—Allen T Cao
(74) *Attorney, Agent, or Firm*—Merchant & Gould

(57) ABSTRACT

A method and apparatus for an improved magnetic read sensor having synthetic or AP pinned layers with high resistance and high magnetoelastic anisotropy is disclosed. A pinned layer includes a cobalt-iron ternary alloy, where a third constituent of the cobalt-iron ternary alloy layer is selected for increasing the resistance and magnetoelastic anisotropy of the cobalt-iron ternary alloy layer.

17 Claims, 7 Drawing Sheets

METHOD AND APPARATUS HAVING IMPROVED MAGNETIC READ HEAD SENSORS

BACKGROUND OF THE INVENTION

1. Field of the Invention

This disclosure relates in general to magnetic read sensors for magnetic storage systems, and more particularly to a method and apparatus for an improved magnetic read sensor having synthetic or AP pinned layer with high resistance and high magnetoelastic anisotropy.

2. Description of Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the sheet of the disk when the disk is not rotating but, when the disk rotates, air is swirled by the rotating disk adjacent an air bearing sheet (ABS) of the slider causing the slider to ride on an air bearing a slight distance from the sheet of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

Today's magnetic disk drives use sensors that are based upon giant magnetoresistance (GMR). In a GMR sensor, an external magnetic field causes a variation in the relative orientation of neighboring ferromagnetic layers. This in turn causes a change in the spin-dependent scattering of conduction. Thus the electrical resistance of the structure varies as the relative alignment of the magnetizations of the ferromagnetic layers changes.

One particularly useful application of GMR is a sandwich structure, called a spin valve. The spin valve includes two essentially uncoupled ferromagnetic layers separated by a nonmagnetic spacer metal layer, usually copper (Cu). In this structure the magnetization of one of the ferromagnetic layers, which is called pinned layer, is usually pinned by an adjacent antiferromagnetic layer (AFM layer), which exchange-couples to the pinned layer. The unpinned layer, or free ferromagnetic layer, is free to rotate in the presence of external magnetic field from the magnetic media. In spin valve structures the resistance between the free and pinned ferromagnetic layers is found to vary as a cosine of the angle between the magnetizations of these layers and is independent of the direction of current flow.

A variation of the sandwiched spin valve GMR structure comprises the synthetic or AP pinned spin valve structure, where the pinned layer is itself a sandwich structure comprising a first pinned layer (keeper layer) adjacent to the AFM pinning layer, and a second pinned layer (reference layer), that is naturally coupled in a direction opposite to the first pinned layer through an exchange coupling layer, that is usually ruthenium (Ru), sandwiched between the first and second pinning layer. The keeper layer may be referred to as AP1 and the reference layer as AP2. This structure may produce a low net magnetic moment to minimize the interaction between the free layer and the synthetic or AP pinned layer.

In general, the voltage output of the GMR spin valve sensor device is proportional to its sheet resistance, $R_S$, the GMR ratio, $\Delta R/R$, and average value of the cosine of the angle between magnetization of the free layer, $\theta_F$, and magnetization of the pinned layer, $\theta_P$, averaged over the stripe height. More specifically, the voltage output of the spin valve sensor device is given as: $V = I_S*(W/2H)*(R_S*\Delta R/R) <\cos \Delta\theta>$.

Here $<\cos \Delta\theta>$ is the average value of the cosine of the angle between magnetization of the free and pinned layers, averaged over the stripe height, and $\Delta\theta=\theta_F-\theta_P$, $I_S$ the sensor current, W is the sensor track width, and H is the sensor throat height. In the ideal case, the pinned layer is fully saturated and its magnetization is perpendicular to the ABS everywhere in the stripe. However in reality this is not the case, because of several reasons which tend to keep pinned layer not fully saturated and rotate its magnetization away from ABS, thus reducing the average value of $\cos \Delta\theta$, and therefore reducing sensor signal output. One reason for that is a reduced exchange pinning due to, for example, patterning or lapping damage, especially near the ABS. Another reason is the magnetostatic energy of the pinned layer, which always tends to rotate pinned layer magnetization away from ABS and parallel to the stripe. These both reasons for reduced saturation magnetization of the pinned layer normal to ABS and a subsequent reduction in sensor amplitude become more important as the stripe height is shrinking. Therefore in order to improve signal output, it is important to have another mechanism to keep magnetization of the pinned layer normal to ABS. One way to do that is to induce strong magnetoelastic anisotropy perpendicular to ABS. The magnetoelastic anisotropy constant is given as $K_\sigma=3/2 \lambda_{PL}\sigma$. In case when total stress $(\sigma)$ acting on the pinned layer is compressive $(\sigma<0)$, the magnetostriction of the pinned layer, $\lambda_{PL}$ must be positive in order to induce preferential anisotropy axis perpendicular to the ABS. Thus magnetoelastic anisotropy normal to ABS can be increased by increasing positive magnetostriction of the pinned layer, $\lambda_{PL}$. This anisotropy will provide strong pinning when interfacial AFM coupling between the antiferromagnetic layer and pinned layer is significantly weakened due to the reasons discussed above. When that happens, the magnetoelastic anisotropy pinning will take over the AFM pinning, and that will maintain high signal output.

As the recording density of disk drives increases, spin valve read heads are required to produce the same or larger signal output from smaller magnetic bits. As evident from the above discussion, this can be achieved by increasing, $\Delta R/R$, Rs or $\lambda_{PL}$. Currently, pinned layers of a GMR read head are fabricated using binary alloys, such as CoFe (cobalt-iron). Using ternary CoFeX alloys can increase pinned layers sheet resistance, $R_S$ and magnetostriction, $\lambda_{PL}$ without reducing its GMR ratio, $\Delta R/R$, and thus increase spin valve head voltage output or amplitude.

Thus it can be seen that there is a need for a method and apparatus for an improved magnetic read sensor having synthetic or AP pinned layers with high resistance and high magnetoelastic anisotropy.

SUMMARY OF THE INVENTION

To overcome the limitations described above, and to overcome other limitations that will become apparent upon reading and understanding the present specification, the present invention discloses a method and apparatus for an improved magnetic read sensor having AP pinned layers with high resistance and high magnetoelastic anisotropy.

The present invention solves the above-described problems by increasing sensor sheet resistance and magnetostriction of a synthetic or AP pinned layer. A synthetic or AP pinned layer includes a cobalt-iron ternary alloy, where a third constituent of the cobalt-iron ternary alloy layer is selected for increasing the sheet resistance and magnetoelastic anisotropy of the cobalt-iron ternary alloy layer over a cobalt-iron binary alloy layer.

In another embodiment of the present invention, a pinned layer in a GMR stack is provided. The pinned layer includes a first pinned layer; an interlayer disposed over the first pinned layer and a second pinned layer disposed over the interlayer, wherein the at least one of the first or second pinned layers comprises a cobalt-iron ternary alloy layer having a third constituent selected for increasing the resistance and magnetoelastic anisotropy of the pinned layers over a cobalt-iron alloy layer.

In another embodiment of the present invention, a magnetic read head is provided. The magnetic read head includes a high resistance AP pinned layer comprising a first cobalt-iron ternary alloy, the cobalt-iron ternary alloy comprising a constituent selected to provide an increase in sheet resistance and magnetoelastic anisotropy over a cobalt-iron alloy layer, an interlayer disposed over the first high resistance pinned layer, a second bi-layer pinned layer, disposed over the coupling layer, the second bi-layer layer comprising a cobalt-iron ternary alloy and a cobalt-iron binary alloy layer, the cobalt-iron ternary alloy further comprising a constituent selected to provide an increase in sheet resistance and magnetoelastic anisotropy over a cobalt-iron alloy layer, a nonmagnetic conductive spacer layer disposed over the bi-layer pinned layer adjacent to the cobalt-iron layer and a free layer disposed over the nonmagnetic conductive spacer layer, the free layer having a magnetization that is free to rotate.

In another embodiment of the present invention, another magnetic read head is provided. This magnetic read head includes a high resistance AP pinned layer comprising a first cobalt-iron ternary alloy, the cobalt-iron ternary alloy comprising a constituent selected to provide an increase in sheet resistance and magnetoelastic anisotropy over a cobalt-iron alloy layer, an interlayer disposed over the first high resistance pinned layer, a second pinned layer, disposed over the coupling layer, a nonmagnetic conductive spacer layer disposed over the second pinned layer; and a free layer disposed over the nonmagnetic conductive spacer layer, the free layer having a magnetization that is free to rotate.

In another embodiment of the present invention, a magnetic storage device is provided. The magnetic storage device includes a magnetic media for storing data thereon, a motor, coupled to the magnetic media, for translating the magnetic media, a transducer for reading and writing data on the magnetic media and an actuator, coupled to the transducer, for moving the transducer relative to the magnetic media, wherein the transducer includes a read sensor comprising a pinned layer in a GMR stack comprising a cobalt-iron ternary alloy layer in at least an AP1 pinned layer, wherein a third constituent of the cobalt-iron ternary alloy layer is selected for increasing the resistance and magnetoelastic anisotropy of the cobalt-iron ternary alloy layer over a cobalt-iron alloy layer.

In another embodiment of the present invention, a method for providing a magnetic read head sensor having high resistance AP layer is provided. The method includes forming a pinned layer in a GMR stack using a cobalt-iron ternary alloy layer wherein a third constituent of the cobalt-iron ternary alloy layer is selected for increasing the resistance and magnetoelastic anisotropy of the cobalt-iron ternary alloy layer over a cobalt-iron alloy layer.

In another embodiment of the present invention, a method for providing a magnetic read head sensor having high resistance AP layers is provided. The method includes forming a first pinned layer; forming an antiferromagnetic coupling layer disposed over the first pinned layer; and forming a second pinned layer disposed over the antiferromagnetic coupling layer; wherein the forming the first and second pinned layers further comprises forming a cobalt-iron ternary alloy layer wherein a third constituent is selected for increasing the resistance and magnetoelastic anisotropy of the pinned layer over a cobalt-iron alloy layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for an improved magnetic read sensor having synthetic or AP pinned layers with high sheet resistance and high magnetoelastic anisotropy. The improvement is achieved by increasing sensor sheet resistance (Rs) and magnetostriction of the pinned layers by adding materials to the AP pinned ferromagnetic layers. The AP pinned ferromagnetic layers can include ternary alloy, e.g., CoFeX, that include metals such as chromium (Cr), molybdenum (Mo), vanadium (V) and tungsten (W) that increase resistivity of and increase the magnetostriction of the pinned layers.

Figure 1:
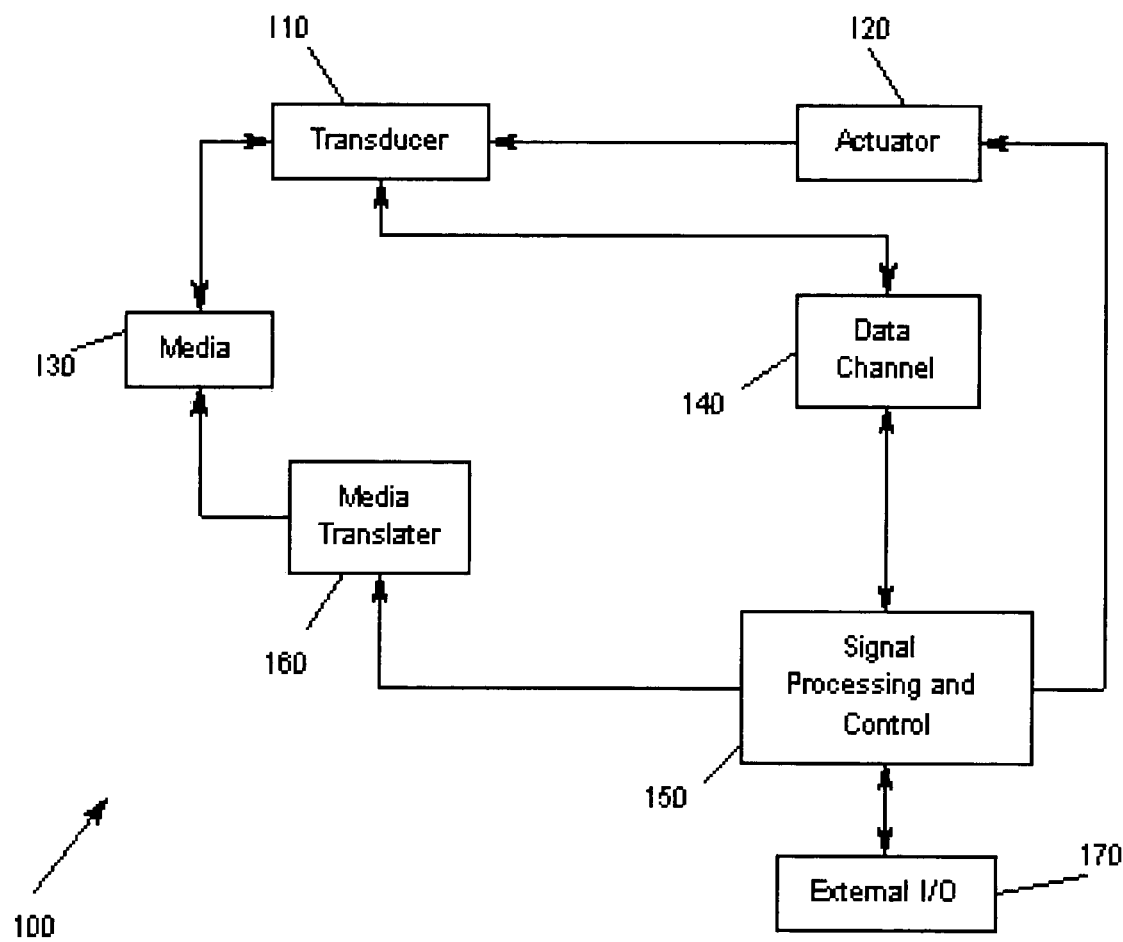
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. In addition, a media translator 160 is controlled by the signal processor 150 to cause the magnetic media 130 to move relative to the transducer 110. However, those skilled in the art will recognize that the present invention is not meant to be limited to a particular type of storage system 100 or to the type of media 130 used in the storage system 100.

Figure 2:
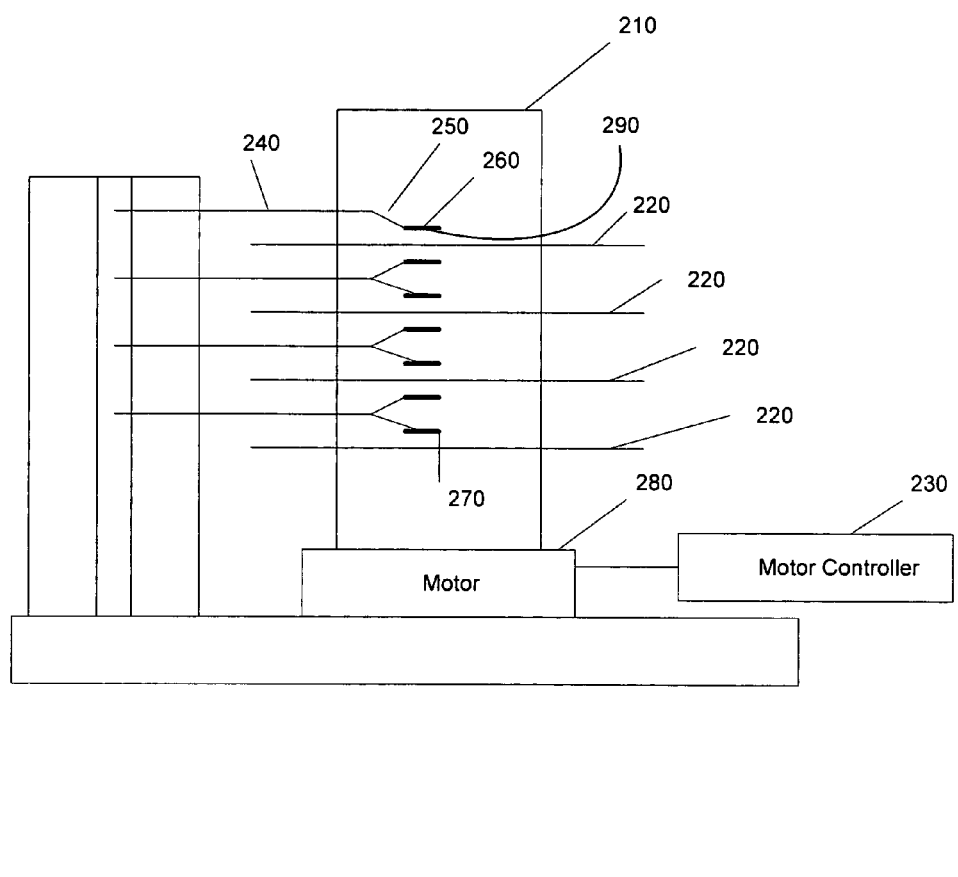
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 according to an embodiment of the present invention is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Read head 270 is disposed at the air bearing sheet (ABS) 290 of the slider240 for reading information from the sheet of disk 220. Although a multiple magnetic disk storage system is illustrated, a single magnetic disk storage system is equally viable in accordance with the present invention.

Figure 3:
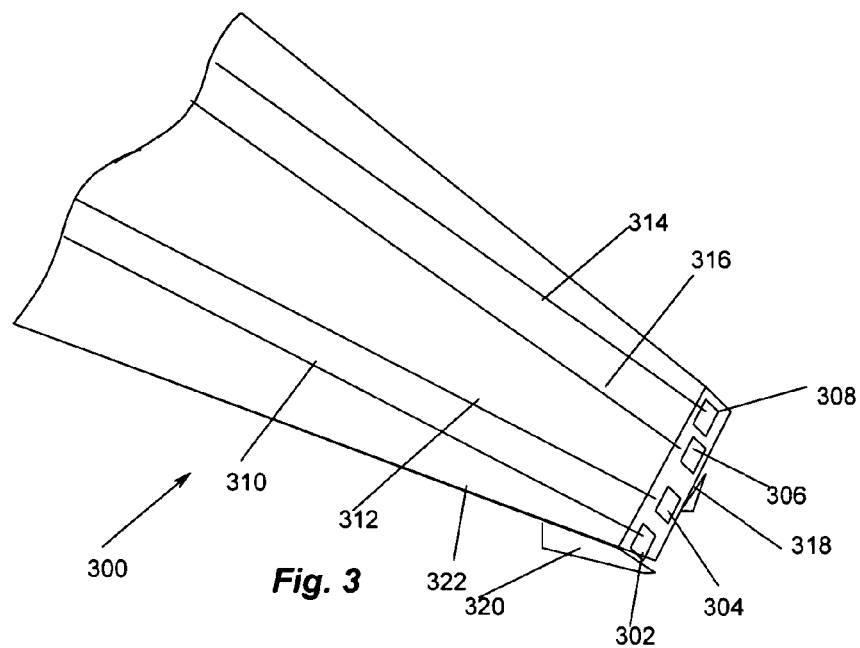
FIG. 3 illustrates a slider mounted on a suspension according to an embodiment of the present invention.

FIG. 3 illustrates a sensor assembly 300. In FIG. 3, a slider 320 is mounted on a suspension322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
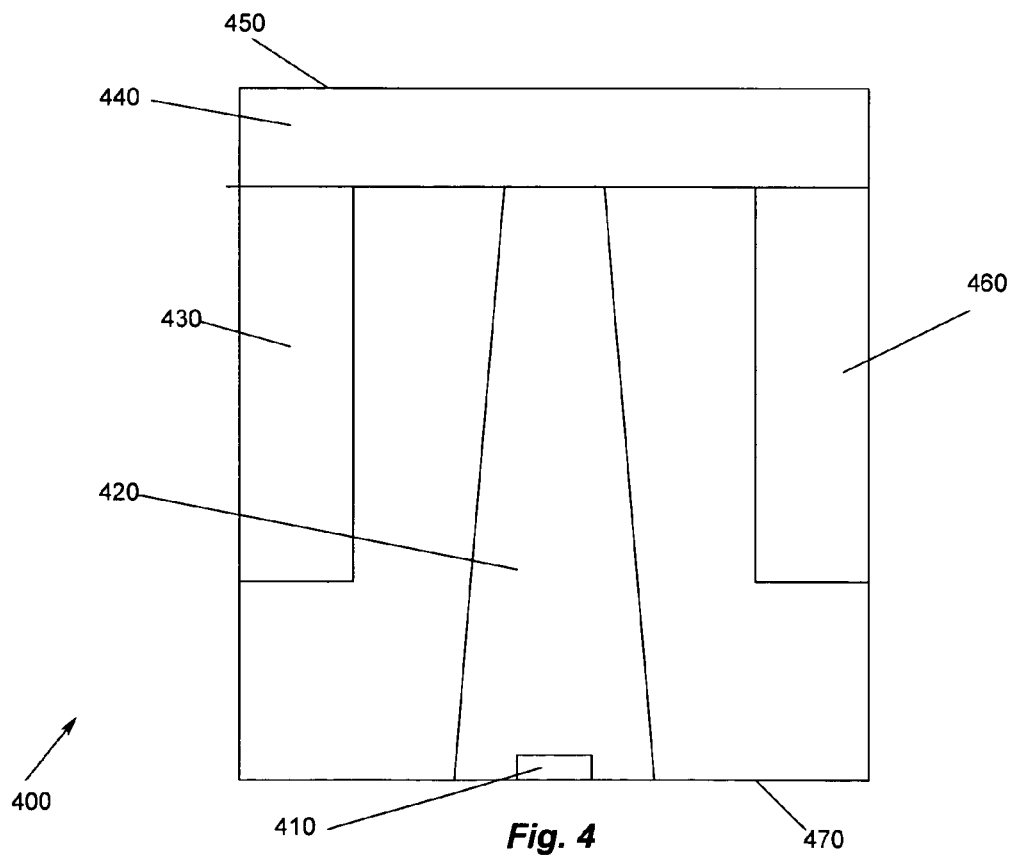
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

In order to produce a larger signal for detecting smaller magnetic bits, GMR read heads with higher sheet resistance and magnetoelastic anisotropy are needed.

Figure 5:
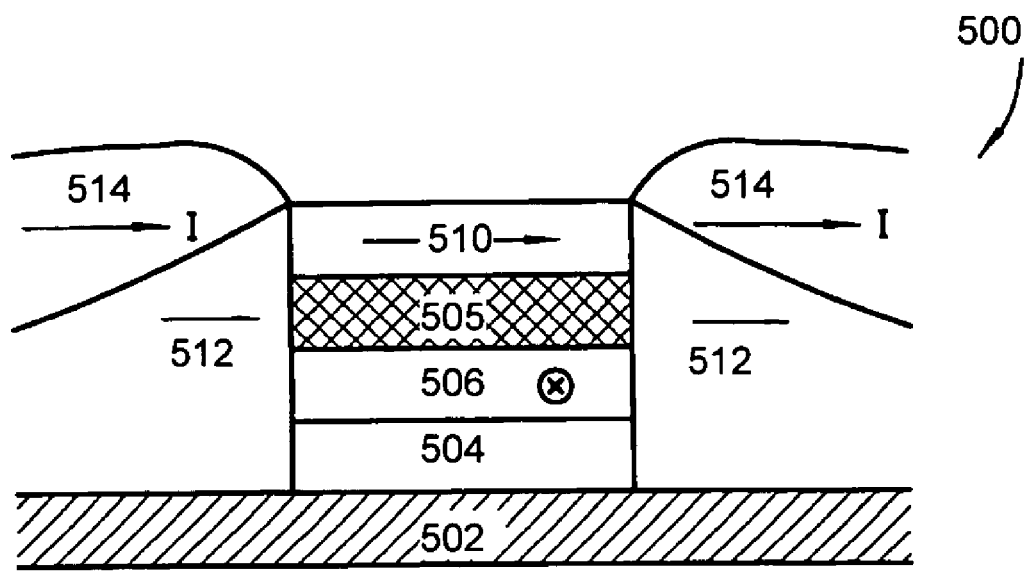
FIG. 5 illustrates the basic components of a typical current-in-plane (CIP) GMR sensor according to one embodiment of the present invention.

FIG. 5 illustrates the basic components of a typical current-in-plane (CIP) GMR sensor 500 according to one embodiment of the present invention. The sensor 500 includes a ferromagnetic pinned layer 506. The ferromagnetic pinned layer 506 is a synthetic or AP pinned layer comprising a keeper layer, an interlayer, e.g., ruthenium, and a reference layer. Further, the keeper layer and the reference layer may also be bi-layers instead of single layers comprising more than one film. The sensor 500 includes a ferromagnetic free layer 510 with a rotatable magnetization vector, which can rotate about the longitudinal direction in response to transverse magnetic signal fields. The direction of the magnetic moment of the pinned layer 506 is typically fixed by exchange coupling with an antiferromagnetic layer 504. Exchange-pinned layer 506 and free layer 510 are separated by a thin electrically conductive nonmagnetic layer 508. Hard bias layers 512 provide a longitudinal biasing magnetic field to stabilize the magnetization of the free layer 510 approximately in a longitudinal orientation in the absence of other external magnetic fields. Sensor 500 further includes top electrical leads 514 in proximity with hard bias layers 512, and a layer 502 adjacent to the antiferromagnetic layer 504, which represents a combination of the substrate, undercoat, and seed layers. For a shielded sensor, layer 502 may additionally include the bottom shield and insulation layers (for CIP sensors) or electrical contact layers (for CPP sensors).

Figure 6:
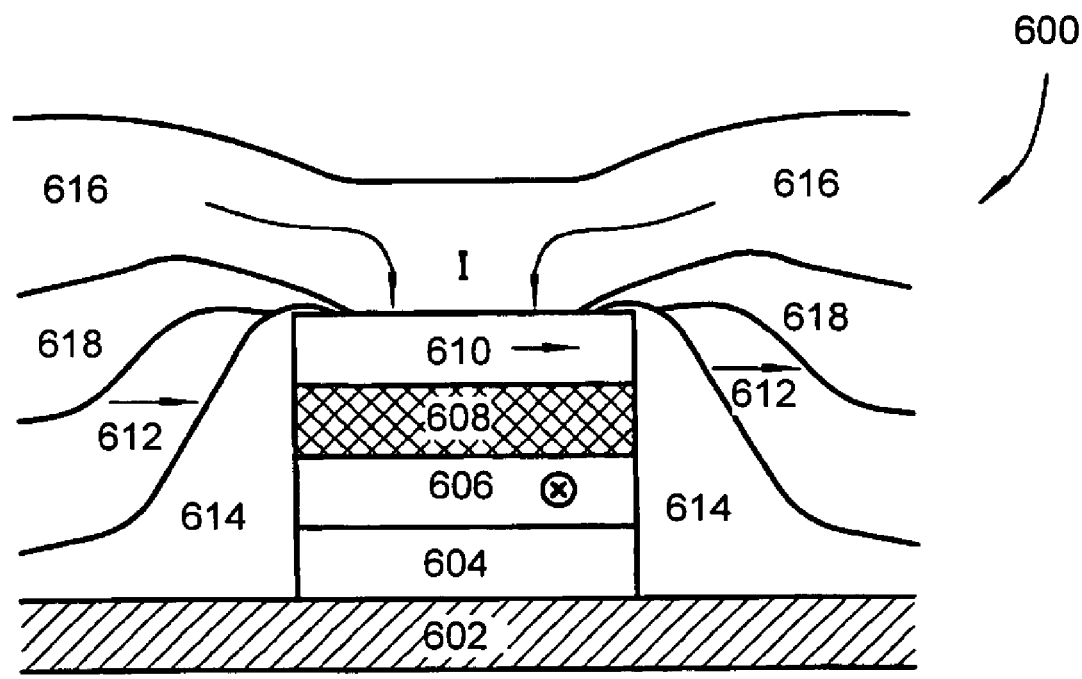
FIG. 6 shows a current-perpendicular-to-plane (CPP) sensor according to one embodiment of the present invention.

FIG. 6 shows a current-perpendicular-to-plane (CPP) sensor 600 according to one embodiment of the present invention. CPP sensor 600 includes a ferromagnetic pinned layer 606. Again, the ferromagnetic pinned layer 606 may be a synthetic or AP pinned layer comprising a keeper layer, an interlayer, e.g., ruthenium, and a reference layer, or further, the keeper layer and the reference layer may also be bi-layers comprising more than one film. The sensor 600 includes a ferromagnetic free layer 610 with a rotatable magnetization vector, which can rotate about the longitudinal direction in response to transverse magnetic signal fields. The direction of the magnetic moment of the pinned layer 606 is typically fixed by exchange coupling with an antiferromagnetic layer 604. The exchange-pinned layer 606 and free layer 610 are spaced apart by a non-magnetic layer 608.

For MTJ devices, layer 608 includes an electrically insulating tunnel barrier layer. For CPP-GMR devices, layer 608 is electrically conductive, and is analogous to layer 508 of the CIP-GMR sensor of FIG. 5. Hard bias layers 612 are electrically insulated from the sensor stack and the top electrical lead 616 by insulating layers 614 and 618 respectively. Hard bias layers 612 provide a longitudinal biasing magnetic field to stabilize the magnetization of the free layer 610. Sensor 600 further includes a layer 602, which is similar to layer 502 of sensor 500, in proximity with the antiferromagnetic layer 604.

The above description of a CPP and CIP magnetic sensor, shown in the accompanying FIGS. 5-6, is for presentation purposes only. Those skilled in the art will recognize that other embodiments that provide CPP and CIP sensors are possible, including dual sensor structures, self-pinned structures, etc.

According to an embodiment of the present invention, read sensors having synthetic or AP pinned layers with high resistance and high magnetoelastic anisotropy are produced by forming AP pinned ferromagnetic layers using CoFe ternary films that include metals such as chromium (Cr), molybdenum (Mo), vanadium (V) and tungsten (W) that increase resistivity and magnetostriction compared to CoFe binary films.

Figure 7:
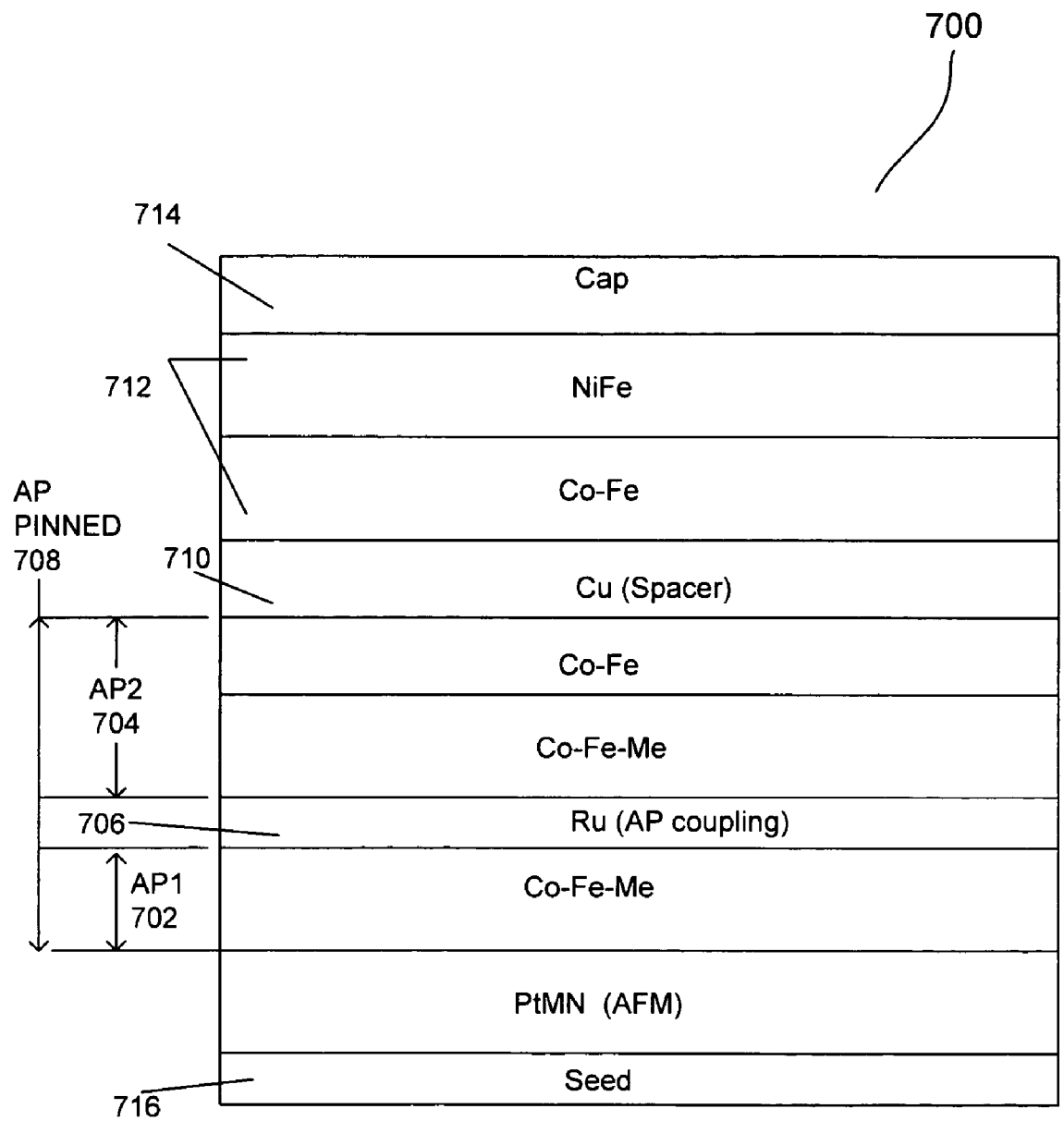
FIG. 7 illustrates a sensor stack in accordance with embodiments of the present invention.

FIG. 7 illustrates one embodiment of a read head sensor stack 700 with an AP1 layer of a CoFe ternary alloy in accordance with embodiments of the present invention. The sensor stack 700 includes a first AP pinned layer (AP1) 702 made of a CoFe ternary alloy. The ternary alloy includes one of: chromium (Cr), molybdenum (Mo), vanadium (V) and tungsten (W), for example.

As shown in FIG. 7, the second AP layer (AP2) 704 may also include a CoFe ternary alloy. In FIG. 7, AP2 704 includes a bi-layer of CoFe on top of a CoFe ternary alloy, wherein the CoFe layer is near the nonmagnetic conductive spacer layer 710. The ternary film is made of a cobalt-iron-metal alloy similar to AP1 702, where the metal can include Cr, Mo, V and W. AP1 702 and AP2 704 are coupled via an antiferromagnetic coupling layer 706 which can be composed of ruthenium (Ru). The cobalt-iron-metal/Ru/cobalt-iron-metal/cobalt-iron layers comprise synthetic or AP pinned layer 708. A nonmagnetic conductive spacer layer 710 can be composed of copper (Cu) and separates the AP pinned layer 708 from the free layer 712 which can include nickel-iron alloy layers (NiFe) and/or cobalt-iron (CoFe) alloy layers. A cap layer 714 is adjacent to the free layer 712 and a seed layer 716 is adjacent to AFM layer that is adjacent to the AP1 702 layer.

According to the present invention in order to increase read head sensor output or amplitude, the AP1 layer 702 may be a single layer that is a CoFe ternary alloy layer, wile AP2 layer 704 may be a bi-layer CoFe/CoFeX. Part of the AP2 adjacent to the spacer layer 710 may be CoFe binary alloy and part adjacent to the coupling layer 706 may be CoFe ternary.

Tables 1 and 2 show amplitude and signal-to-noise (SNR) ratio at the device level for spin valves heads having different compositions of AP1 for thin Ru (~5 Å) and thick Ru (8 Å) cases.

TABLE 1

| AP1 | Ru, Å | AP2 | Amplitude, µV | SNR, dB |
| --- | --- | --- | --- | --- |
| Co-10% Fe | 8 Å | Co-10% Fe | 973 | 33.1 |
| Co-47.5% Fe-5% V | 8 Å | Co-10% Fe | 1053 | 33.2 |

TABLE 2

| AP1 | Ru, Å | AP2 | Amplitude, µV | SNR, dB |
| --- | --- | --- | --- | --- |
| Co-10% Fe | 5.5 Å | Co-10% Fe | 1054 | 33.6 |
| Co-47.5% Fe-5% V | 4.8 Å | Co-10% Fe | 1202 | 34.5 |

As can be seen, by switching AP1 material from Co-10% Fe to Co-47.5% Fe-5% Ve, spin valve head amplitude increased by about 8% and 13%, and SNR increased by 0.1 dB and 0.9 dB for thick and thin Ru cases, respectively, according to the embodiment of this invention. This gain in amplitude is attributed to higher resistivity and higher magnetostriction of the pinned layer, while GMR of the spin valve structure remained substantially unchanged, as is shown in Tables 3 and 4 and FIG. 8.

Tables 3 and 4 show parameters of a spin valve witness coupons deposited at the same time as the wafers from which heads discussed in Tables 1 and 2 were built. An AP1 layer of Co-10% Fe10 is compared to a Co-47.5% Fe-5% V AP1 layer according to an embodiment of the present invention, for two cases of thin Ru (~5 Å) and thick Ru (8 Å).

TABLE 3

| AP1 | Ru, Å | AP2 | ΔR/R (%) | $R_s$(Ω/sq) | $\lambda_{PL}$ at AP1 = 30 Å |
| --- | --- | --- | --- | --- | --- |
| Co-10% Fe | 8 Å | Co-10% Fe | 13.19 | 24.33 | +1.1E−05 |
| Co-47.5% Fe-5% V | 8 Å | Co-10% Fe | 13.02 | 25.39 | +2.6E−05 |

TABLE 4

| AP1 | Ru, Å | AP2 | ΔR/R (%) | $R_s$(Ω/sq) | $\lambda_{PL}$ at AP1 = 30 Å |
| --- | --- | --- | --- | --- | --- |
| Co-10% Fe | 5.5 Å | Co-10% Fe | 12.09 | 25.44 | +1.1E−05 |
| Co-47.5% Fe-5% V | 4.8 Å | Co-10% Fe | 12.38 | 26.81 | +2.6E−05 |

As can be seen in both cases of thin and thick Ru, the GMR ratio, ΔR/R, is about the same, while the sheet resistance, $R_S$, increases by about 1 Ω/sq. At the same time, the magnetostriction of the pinned layer also increases from +1.1E-05 for Co-10% Fe AP1, to +2.6E-05 for Co-47.5% Fe-5% V AP1, when AP1 magnetic thickness is ~30 Å.

Figure 8:
FIG. 8 is a graph comparing the magnetostriction of a CoFeV and CoFe pinned layers at different thicknesses according to an embodiment of the present invention.
Figure 8:
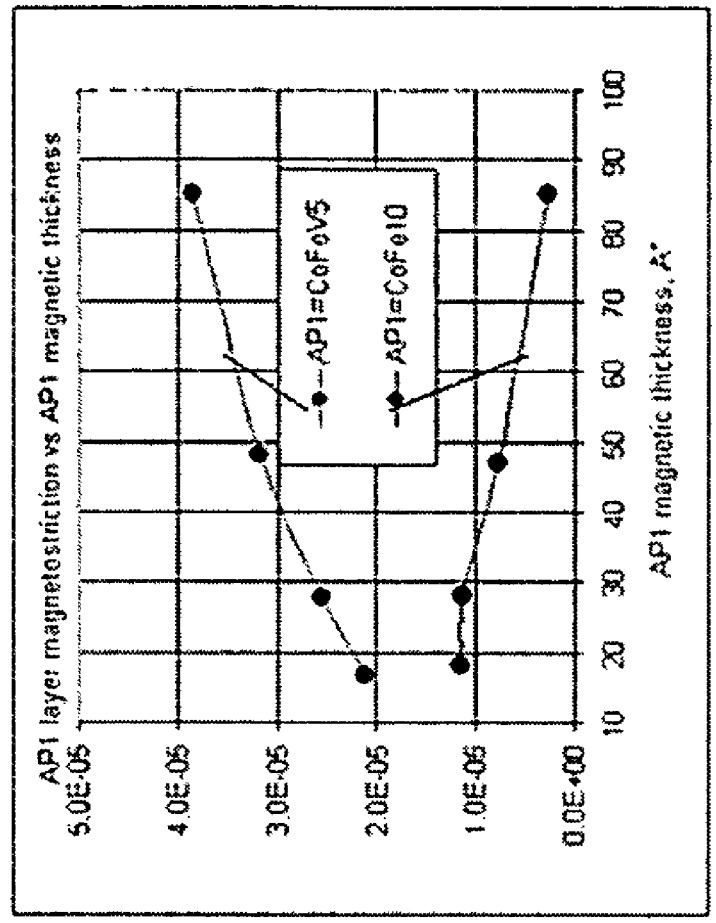

FIG. 8 is a graph 850 comparing magnetostriction of Co-10% Fe and Co-47.5% Fe-5% V AP1 layers as a function of the AP1 layer magnetic thickness, according to an embodiment of the present invention. FIG. 8 shows that the magnetostriction of the Co-47.5% Fe-5% V AP1 layer is substantially greater than that of the Co-10% Fe AP1 layer in the range of magnetic thicknesses from about 15 Å to 85 Å. As mentioned above, at AP1=30 Å, magnetostriction of the Co-47.5% Fe-5% V AP1 layer is about +2.6E-05, as compared to +1.1 E-05 for the Co-10% Fe AP1 layer. According to an embodiment of the present invention, a pinned layer includes a CoFe ternary alloy, which includes Cr, Mo, V and W at an atomic percent that ranges from about 0.5 to about 7.0%. These relatively small additions of Cr, Mo, V and W to cobalt-iron yield a significant increase in resistivity and magnetostriction compared to a cobalt-iron alloy, without any substantial reduction in saturation flux density. Thus, CoFeX AP1 materials give higher sheet resistance, Rs. Also, CoFeX AP1 materials increase magnetoelastic anisotropy, which keeps pinned layer better saturated perpendicular to the ABS. This stronger pinning and higher resistivity increase head amplitude indicating that CoFeX ternary alloys are better AP1 materials than CoFe binary alloys.

While the above examples included an AP1 layer having an iron composition of 47.5 atomic %, and vanadium composition of 5 atomic %, the atomic percentage of iron may range from about 10% to about 55% and the atomic percentage of vanadium, V, may range from about 0.5% to about 7.0%. Thus, it can be seen that spin valve having an AP1 of Co-47.5% Fe-5% V has essentially the same ΔR/R, but higher sheet resistance, $R_S$, and higher magnetostriction, $\lambda_{PL}$, than a spin valve having an AP1 of Co-10% Fe, which on device level translated into higher amplitude.

Figure 9:
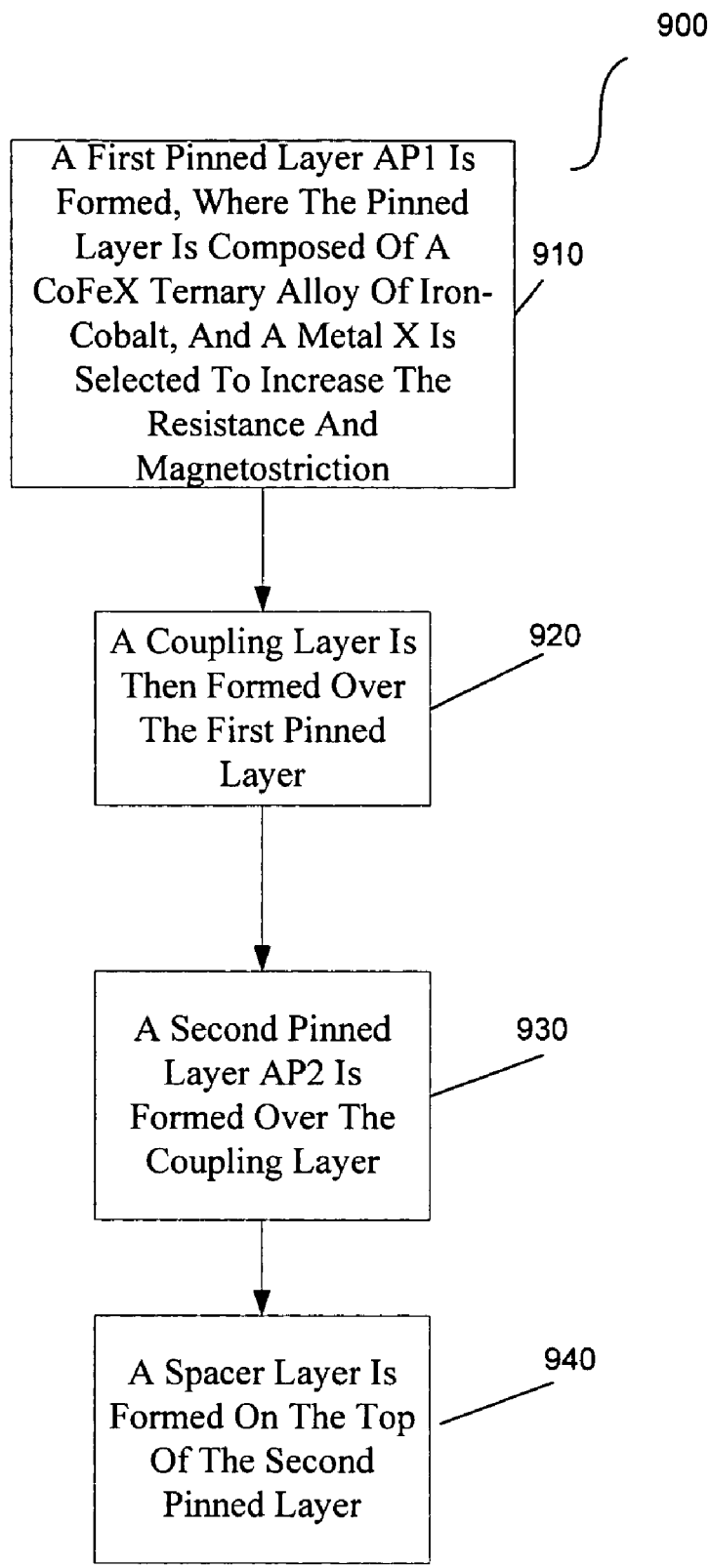
FIG. 9 is a flowchart of a method for fabricating a read head sensor with high resistance synthetic AP pinned layers in accordance with embodiments of the present invention.

FIG. 9 is a flowchart of a method 900 for fabricating a read head sensor with high resistance AP layers in accordance with embodiments of the present invention. Accordingly, a first pinned layer AP1 is formed 910, where the pinned layer is composed of a CoFeX ternary alloy of iron-cobalt, and a metal X is selected to increase the resistance and magnetostriction. A coupling layer is then formed over the first pinned layer 920. Over the coupling layer a second pinned layer AP2 is formed 930. A Spacer Layer is formed on The Top Of the second pinned layer 940. The second pinned layer may be a bi-layer, wherein the bottom layer adjacent to the coupling layer is a CoFeX ternary alloy also having a metal X selected to increase the resistance of the pinned layer, and the top layer, adjacent to the spacer layer is CoFe.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An synthetic or AP pinned layer in a GMR stack, comprising a cobalt-iron ternary alloy layer, wherein a third constituent of the cobalt-iron ternary alloy layer is selected from the group consisting of vanadium, chromium, molybdenum and tungsten , wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$.

2. A synthetic or AP pinned layer in a GMR stack, comprising:
- a first pinned layer; an interlayer disposed over the first pinned layer; and
- a second pinned layer disposed over the interlayer;
- wherein the at least one of the first or second pinned layers comprises a cobalt-iron ternary alloy layer having a third constituent selected from the group consisting of vanadium, chromium, molybdenum and tungsten, wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$.

3. The synthetic or AP pinned layer of claim 2, wherein the first pinned layer is adjacent to an antiferromagnetic layer.

4. The synthetic or AP pinned layer of claim 2, wherein the interlayer comprises a ruthenium (Ru) layer.

5. A magnetic read head, comprising:
- a high resistance AP pinned layer comprising a first cobalt-iron ternary alloy, the cobalt-iron ternary alloy comprising a constituent selected from the group consisting of vanadium, chromium, molybdenum and tungsten, wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$;
- an interlayer disposed over the first high resistance pinned layer;
- a second bi-layer pinned layer, disposed over coupling layer, the second bi-layer layer comprising a cobalt-iron ternary alloy and a cobalt-iron binary alloy layer, the cobalt-iron ternary alloy further comprising a constituent selected to provide an increase in sheet resistance and magnetoelastic anisotropy over a cobalt-iron alloy layer;
- a nonmagnetic conductive spacer layer disposed over the bi-layer pinned layer adjacent to the cobalt-iron layer; and
- a free layer disposed over the nonmagnetic conductive spacer layer, the free layer having a magnetization that is free to rotate.

6. The magnetic read head of claim 5, wherein the free layer comprises a laminated free layer of cobalt-iron (CoFe) and nickel-iron (NiFe) layers.

7. The magnetic read head of claim 5, wherein the free layer comprises a free layer of cobalt-iron (CoFe).

8. The magnetic read head of claim 5, wherein the non magnetic conductive spacer layer comprises a copper (Cu) layer.

9. The magnetic read head of claim 5, wherein the interlayer comprises a ruthenium (Ru) layer.

10. A magnetic read head, comprising:
- a high resistance AP pinned layer comprising a first cobalt-iron ternary alloy, the cobalt-iron ternary alloy comprising a constituent selected from the group consisting of vanadium, chromium, molybdenum and tungsten, wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$;
- an interlayer disposed over the first high resistance pinned layer;
- a second pinned layer, disposed over coupling layer;
- a nonmagnetic conductive spacer layer disposed over the second pinned layer;
- and a free layer disposed over the nonmagnetic conductive spacer layer, the free layer having a magnetization that is free to rotate.

11. The magnetic read head of claim 10, wherein the free layer comprises a laminated free layer of cobalt iron (Co-Fe) and nickel iron (Ni-Fe) layers.

12. The magnetic read head of claim 10, wherein the free layer comprises a free layer of cobalt-iron (CoFe).

13. The magnetic read head of claim 10, wherein the non-magnetic conductive spacer layer comprises a copper (Cu) layer.

14. The magnetic read head of claim 10, wherein the interlayer comprises a ruthenium (Ru) layer.

15. A magnetic storage device, comprising:
- a magnetic media for storing data thereon;
- a motor, coupled to the magnetic media, for translating the magnetic media;
- a transducer for reading and writing data on the magnetic media; and
- an actuator, coupled to the transducer, for moving the transducer relative to the magnetic media;
- wherein the transducer includes a read sensor comprising a pinned layer in a GMR stack comprising a cobalt-iron ternary alloy layer in at least an AP1 pinned layer, wherein a third constituent of the cobalt-iron ternary alloy layer is selected from the group consisting of vanadium, chromium, molybdenum and tungsten, wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$.

16. The magnetic storage device of claim 15, wherein the pinned layer further comprises an interlayer disposed over the cobalt-iron ternary alloy layer and a bi-layer pinned layer disposed over the antiferromagnetic coupling layer.

17. A method for providing a magnetic read head sensor having high resistance AP layer, comprising: forming a pinned layer in a GMR stack using a cobalt-iron ternary alloy layer wherein a third constituent of the cobalt-iron ternary alloy layer is selected from the group consisting of vanadium, chromium, molybdenum and tungsten, wherein the amount of the third constituent of the cobalt-iron ternary alloy ranges from about 0.5 to about 7.0 atomic percent and the iron in the cobalt-iron ternary alloy ranges from about 10 to about 55 atomic percent, wherein a percentage of the third constituent of the cobalt-iron ternary alloy layer is selected to provide a magnetostriction ranging from about $2\times10^5$ to about $4\times10^5$.

* * * * *